United States Patent Office 3,415,345
Patented Dec. 10, 1968

3,415,345
TORQUE CONVERTER WITH CLUTCH ENGAGED AND RELEASED BY DIFFERENT PRESSURES
Jean G. Cadiou, Paris, France, assignor to Societe Anonyme Andre Citroen, Paris, France, a French societe
Filed Sept. 30, 1966, Ser. No. 583,332
Claims priority, application France, Oct. 26, 1965, 36,295
7 Claims. (Cl. 192—3.33)

ABSTRACT OF THE DISCLOSURE

A hydraulically operated torque converter and a mechanical clutch adapted to be connected to one element of the converter. A distributor device for selectively establishing the hydraulic fluid pressure at suitable predetermined values in control circuits for the mechanical clutch. A first fluid circuit to feed fluid under pressure to a first face of the clutch plate in the direction of declutching and a second fluid circuit to feed fluid under pressure to the torque converter and simultaneously to the other face of the clutch plate in the direction of clutching. The two fluid circuits each having a discharge valve therein, and the discharge valve of the first fluid circuit controlling the pressure in the first circuit so that the pressure therein is greater than the discharge pressure controlled by the valve of the second fluid circuit.

---

In certain motor vehicles, a power transmission is used which essentially comprises a hydrokinetic torque converter associated with a mechanical clutch, operating in oil, connected to the output turbine of the converter, for driving a conventional gear box. An axially movable plate, adjacent the mechanical clutch, causes the latter to be engaged or put into the rest position. To this end, this plate is exposed on one or other of its faces to oil under pressure which can pass through the converter. The reversal of the direction of circulation of this oil causes the pressure to exert itself on one or other of the faces of the plate and consequently produces the clutching or declutching of the mechanical component. The desired reversal is effected by means of a distributor connected for example to the gear change lever under the operation of the driver.

It will be apparent that the declutching action must be rapid. This result is most surely obtained by giving the fluid a high pressure which most easily supports the charge losses of the circuit and which most clearly rises above the opposing dynamic pressure which becomes considerable at high speeds of rotation.

On the other hand, it is not desirable that the converter shall operate at too high an oil pressure which is added to the dynamic pressure and which subjects it to stresses which are too high.

Attempts have previously been made to reconcile these two opposing desiderata, by choosing an oil pressure of intermediate value which is a disadvantage for the operation of the mechanical clutch and the converter.

The invention has for an object satisfying these two desiderata of low pressure and high pressure, in order to obtain, in all circumstances, the best operation of the components incorporated.

To this end, according to the invention, the oil circuit serving to apply oil under pressure on the face of the plate in the direction of declutching is provided with an adjustable discharge valve whilst the circuit serving to apply oil under pressure on the other face of the plate in the direction of clutching is provided with another adjustable discharge valve which is adjusted to a value which is different from the adjustment of the first valve.

In a preferred embodiment of the invention, the adjusted valve for the lower pressure is situated on the body of the distributor substantially in the same transverse plane as the outlet aperture of the corresponding direction of distribution, whilst the valve adjusted to the higher pressure is situated on the body of the distributor, in the same discharge chamber as the preceding valve, substantially in the same transverse plane as the inlet aperture of the oil in the distributor.

Figure 1:
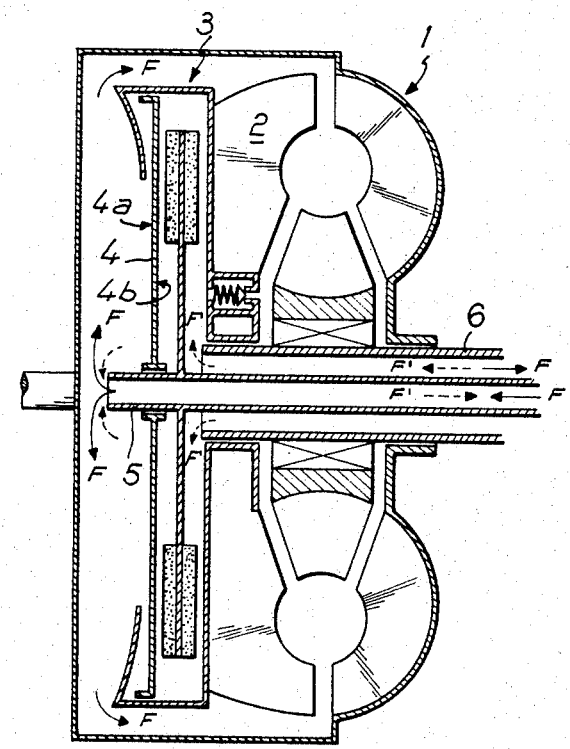
Figure 6:
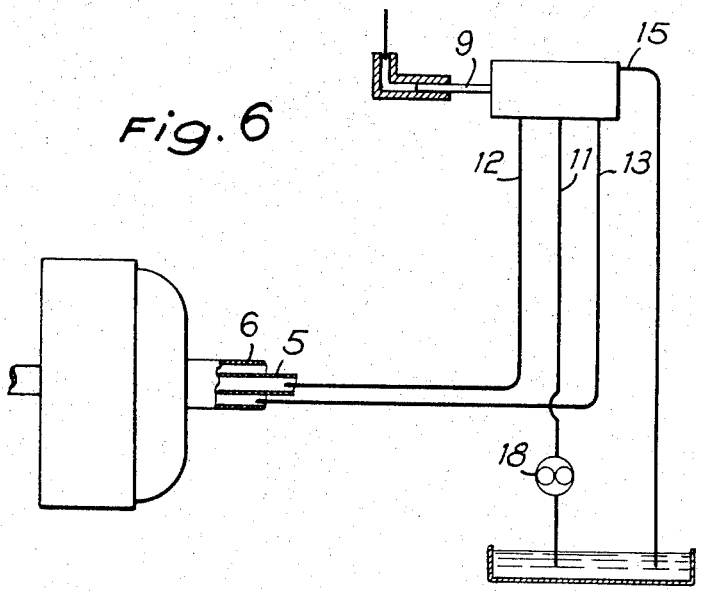
Figure 2:
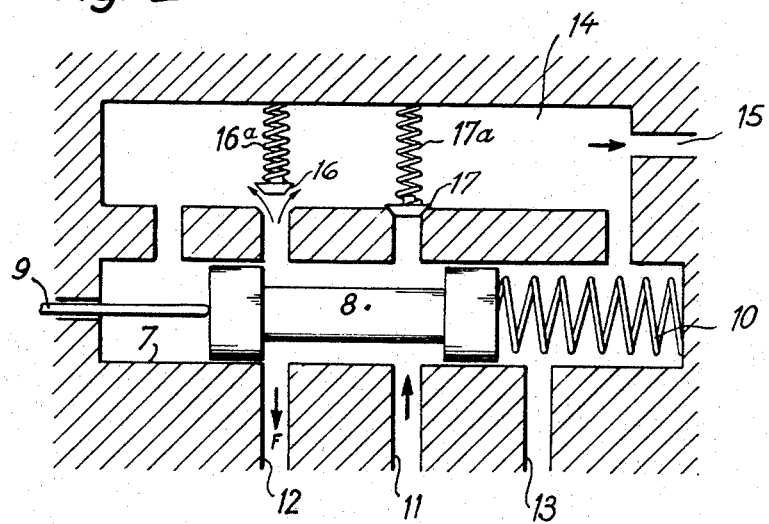
Figure 3:
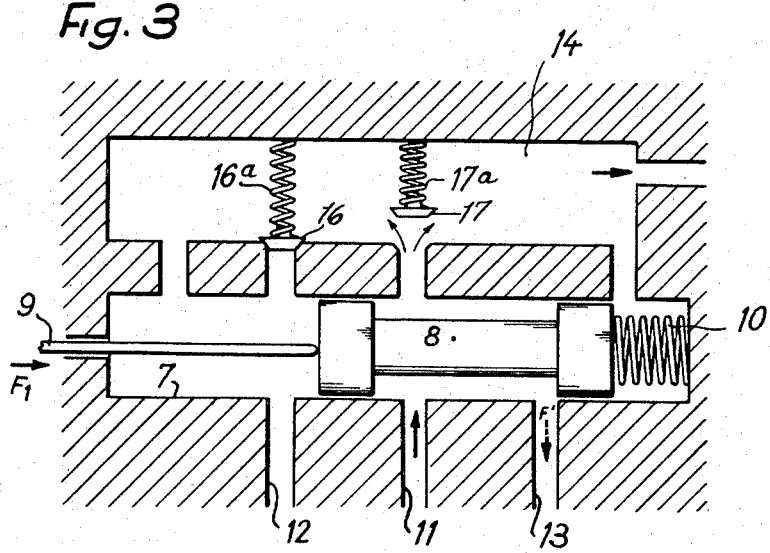
Figure 4:
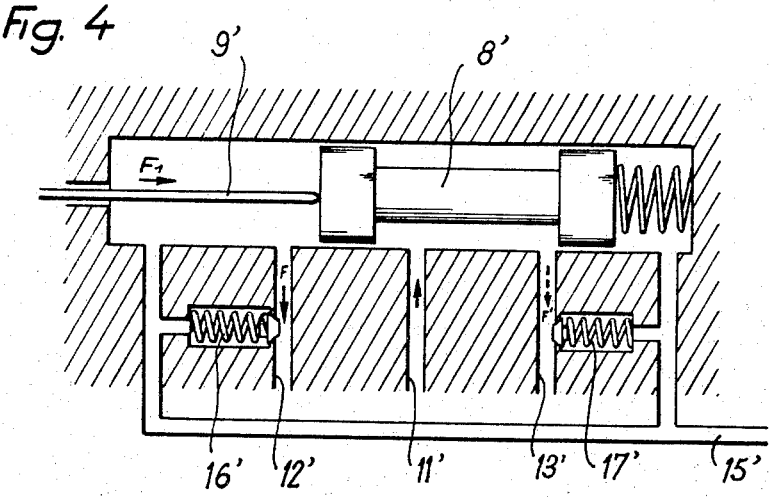
Figure 5:
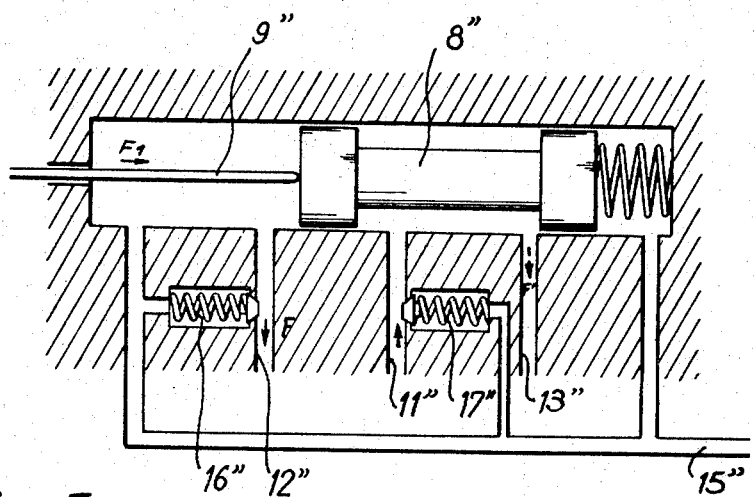

In order that the invention may be more readily understood and its secondary features as well as its advantages may be more readily appreciated, reference will now be made to the accompanying drawings which show certain embodiments thereof by way of example, and in which:

FIGURE 1 shows schematic sectional view of a mechanical clutch-converter assembly with two directions of oil circulation, FIGURE 2 shows a sectional view of a distributor according to the invention, associated with the assembly of FIGURE 1, and shown in a first position, FIGURE 3 shows a sectional view similar to FIGURE 2, but the distributor being shown in its second position, FIGURE 4 shows a part-schematic view showing a modification of the adjustable valves in the distribution circuit, FIGURE 5 shows a part-schematic view showing another modification of the adjustable valves, and FIGURE 6 shows a general schematic view showing the circuit for connecting the distributor of FIGURES 2 and 3 to the clutch-converter assembly.

Referring now to the drawings, FIGURE 1 shows a converter generally indicated at 1, and having an output turbine 2 connected to a mechanical clutch generally designated at 3. This latter may be engaged with the aid of a plate 4 mounted to slide on a hollow shaft 5 which is itself located inside another hollow shaft 6. Since such an assembly is already known, it does not appear necessary to describe it in detail. It is sufficient to note here that the hollow concentric shafts 5 and 6 constitute an oil inlet circuit in which the circulation may be effected in the direction of arrows F (in solid lines) or in the direction of arrows F' (in interrupted lines).

In the first case, the oil under pressure bears upon the face 4a (on the left of the figure) of the plate 4, engages the clutch 3, and passes through the converter 1.

In the second case, the oil under pressure bears on the opposite face 4b of the plate 4 and produces the declutching of the mechanical clutch.

The reversal of the direction of circulation is effected by means of a distributor which is shown in FIGURES 2 and 3. It comprises a cylindrical body 7 containing a distribution slide or piston 8 which can be moved between two positions under the effect of an external action, exerted in the direction $F_1$, by means of a thrust member 9 against the action of a return spring 10 situated at the opposite end between the slide 8 and the body 7.

This latter has a central lateral aperture 11 connected to a pump 18 for supplying pressurised fluid (shown in FIGURE 6) and two end apertures 12 and 13 connected respectively, one to the hollow shaft 5 (direction of circulation F) the other to the hollow shaft 6 (direction of circulation F').

Along the body 7, opposite the apertures 11, 12 and 13, there is a discharge chamber 14 with which the extreme volumes existing between the slide 8 and the cylindrical body 7 communicate.

This chamber 14 is itself connected by means of an aperture 15 to the oil tank of the pump 18 (FIGURE 6). In the chamber 14 there are located, parallel to one another, two biased discharge valves 16 and 17 which are adjusted to different opening values by springs 16a and 17a, a relatively low value spring 16a for valve 16, relatively high value spring 17a for valve 17. The springs 16a and 17a may be of course replaced by springs having different strengths to accurately adjust the opening of the valves under all pressure conditions.

The valve 16 is situated opposite the outlet aperture 12, practically in the same transverse plane, whilst the valve 17 is similarly situated opposite the inlet aperture 11.

In the position of the slide 8 which can be seen in FIGURE 2, the inlet aperture 11 is placed in communication with the outlet aperture 12; the two valves 16 and 17 are subjected to the pressure of the oil sent by the pump. The valve 16, with a lower strength spring, opens by itself. The circulation is effected in the direction F— under a low pressure— and causes the mechanical clutch 3 to come into operation.

In the second position of the slide 8 which can be seen in FIGURE 3, the inlet aperture 11 is placed in communication with the outlet aperture 13; the valve 16 is isolated but the valve 17 remains exposed to the pressure and it regulates the value of the latter to a high level. Circulation is effected in the direction F' at a high pressure which ensures a complete and rapid declutching of the clutch 3.

Consequently, due to the invention, two different pressures are obtained in the same circuit according to the direction of circulation of the oil. Declutching is effected more clearly whilst the converter operates at the highest pressure which is suitable for it. The pump discharges, for most of the time, at low pressure, this being favourable to its duration and to the silence of its operation.

It is obvious that the two valves 16 and 17 can be arranged differently; an embodiment has been described which is considered to be particularly advantageous but it will be apparent that either of the valves could be placed, for example, separately on the outlet apertures 12 and 13 of the distributor. This modification can be seen in FIGURE 4 where the valves 16' and 17', having low and high strength springs respectively, are mounted on the outlet pipes 12' and 13' of the distributor and are connected by a return tube 15'.

In another modification (FIGURE 5), the valve 17" having the high strength spring can be placed on the supply pipe 11" of the distributor.

I claim:

1. An arrangement comprising a hydraulically operable torque converter having a mechanical clutch connectable to one element of said converter; said mechanical clutch including a clutch plate having two oppositely directed faces and a distributor device for actuating said plate; said distributor device comprising a first fluid circuit to feed fluid under pressure to a first face of said clutch plate so as to actuate the plate in the direction of declutching, and a second fluid circuit to feed fluid under pressure simultaneously to the torque converter and to the other face of the clutch plate so as to actuate said plate in the direction of clutching; and a regulated discharge valve contained in each of said two fluid circuits; the discharge valve of the first fluid circuit being regulated so as to cause the discharge pressure of said first fluid circuit to be greater than the discharge pressure of the second fluid circuit to thereby allow said clutch plate to be operated more rapidly in the direction of declutching.

2. An arrangement according to claim 1, wherein said valves open into a discharge chamber incorporated in said distributor device.

3. An arrangement according to claim 1, wherein said valves are located in outlet apertures of said distributor device directed towards areas adjacent the said two faces of said clutch plate, said two discharge outlets being connected to a return pipe.

4. An arrangement according to claim 1 wherein said valve regulated so as to cause the greater discharge pressure is located at the inlet aperture of asid distributor device.

5. An arrangement according to claim 1, wherein said valves are located in extensions of the outlet apertures of said distributor device directed towards areas adjacent the said two faces of said clutch plate, said two discharge outlets being connected to a return pipe.

6. An arrangement according to claim 1 wherein said valve regulated so as to cause the greater discharge pressure is located in the supply conduit leading to the inlet aperture of said distributor device.

7. An arrangement according to claim 1 wherein the means for regulating said discharge valves are different strength springs; the spring regulating said valve causing the greater discharge pressure being of a higher strength than the spring regulating the pressure of the second fluid circuit.

References Cited

UNITED STATES PATENTS

| | | | |
|---|---|---|---|
| 2,736,412 | 2/1956 | Livezey | 192—3.3 X |
| 2,824,632 | 2/1958 | Lucia et al. | 192—3.3 |
| 2,992,713 | 7/1961 | Stump et al. | 192—3.33 |
| 3,224,537 | 12/1965 | Hilpert | 192—3.3 X |
| 3,235,043 | 2/1966 | Maurice et al. | 192—3.33 X |

BENJAMIN W. WYCHE III, *Primary Examiner.*

U.S. Cl. X.R.

192—86